Figure 1:
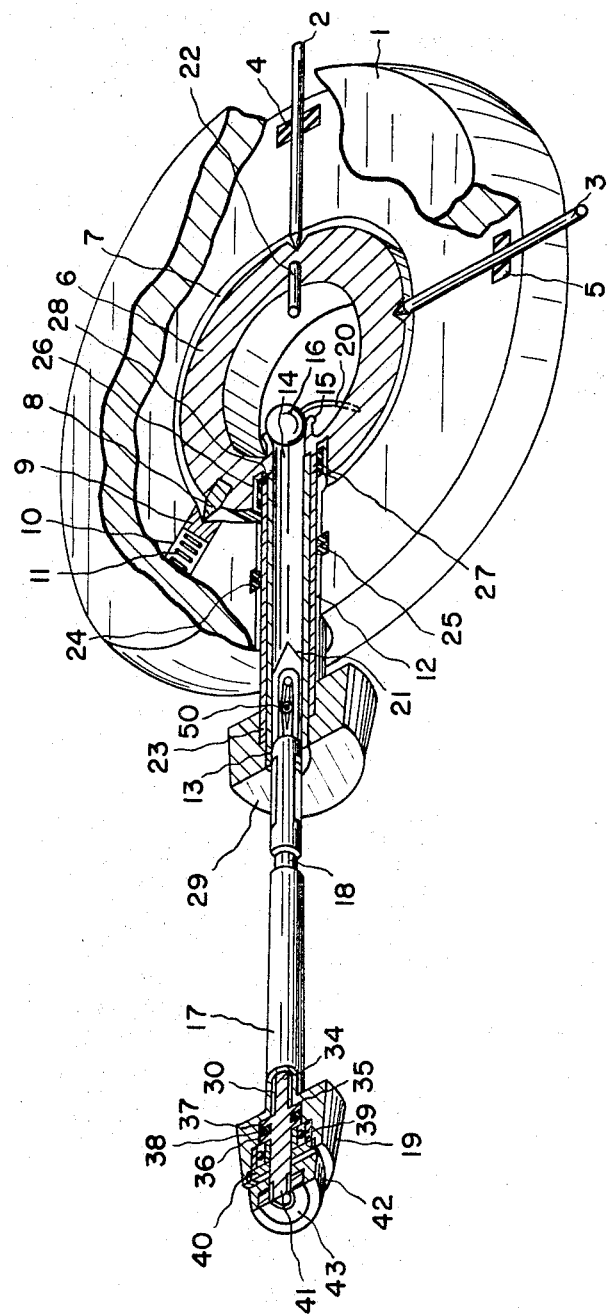

United States Patent Office 3,342,994
Patented Sept. 19, 1967

3,342,994
SPECIMEN SUPPORT FOR AN ELECTRON MICROSCOPE WITH MEANS TO ROTATE A CIRCULAR SPECIMEN HOLDER
Adrianus Jacobus Jozef Franken and Jacob Langerhorst, Emmasingel, Eindhoven, Netherlands, assignors to North American Philips Company, Inc., New York, N.Y., a corporation of Delaware
Filed July 31, 1964, Ser. No. 386,580
Claims priority, application Netherlands, Aug. 28, 1963, 297,241
2 Claims. (Cl. 250—49.5)

Electron microscopes for examining materials by means of electron rays utilize devices adapted to move the specimen to be examined which is placed in a holder into the path of rays of the microscope by means of a vacuum lock, which holder can undergo small displacements in a plane at right angles to the axis of the electron beam and in the direction of the axis and is rotatable about an axis located in the same plane.

The displacements which the specimen can undergo serve to displace the impact area of the electron beam over the surface and by rotating the holder the specimen surface is placed at an angle to the axis of the beam and stereoscopic photographs can thus be taken. The device may also be used in taking diffraction photographs which are obtained when utilizing the diffraction of the electron rays upon penetrating the material. Such photographs are used for determining crystal structures and for deducing the configuration of the atoms in the crystals.

By suitable adjustment of the power of refraction of the electron lenses diffraction images are obtained if the path of the electron ray which impinges on the specimen surface includes one or more groups of lattice planes the mutual distances of which and the angle at which the electron ray is incident on the lattice planes give rise to reflection of electrons. By rotating the specimen about the rotary spindle present in the known device for taking stereoscopic photographs, the angle of incidence is varied and diffraction photographs of more groups of lattice planes may be obtained. Lattice planes the location of which with respect to the incident electrons is not changed or only slightly changed by the rotation of the holder cannot assist in the examination so that when using the known device for adjusting a specimen, it is not always possible to obtain all the diffraction photographs required for the determination of a structure.

It is an object of the invention to obviate this disadvantage and the invention relates to an adjusting device comprising a holder for the specimen, which holder is situated at the end of a support by which the specimen is moved through the wall of the microscope into the axis of the beam of rays. According to the invention, the holder is connected to the support in a manner which makes it possible that the holder is rotatable with respect to the support about an axis at right angles to the specimen surface, means being provided for rotating the holder about the said axis by means of an operating member arranged at the end of the support which projects from the housing of the microscope.

Due to the rotatable arrangement of the specimen holder, the usual displaceability of the specimen in a plane at right angles to the axis of the electron beam and the rotation about an axis located in this plane are supplemented by a movement of the specimen which makes it possible at any point to radiate electrons through the specimen at an angle adjustable at will so that any adjustment of the specimen dependent on the location of the lattice planes in the material may be obtained.

Figure 2:
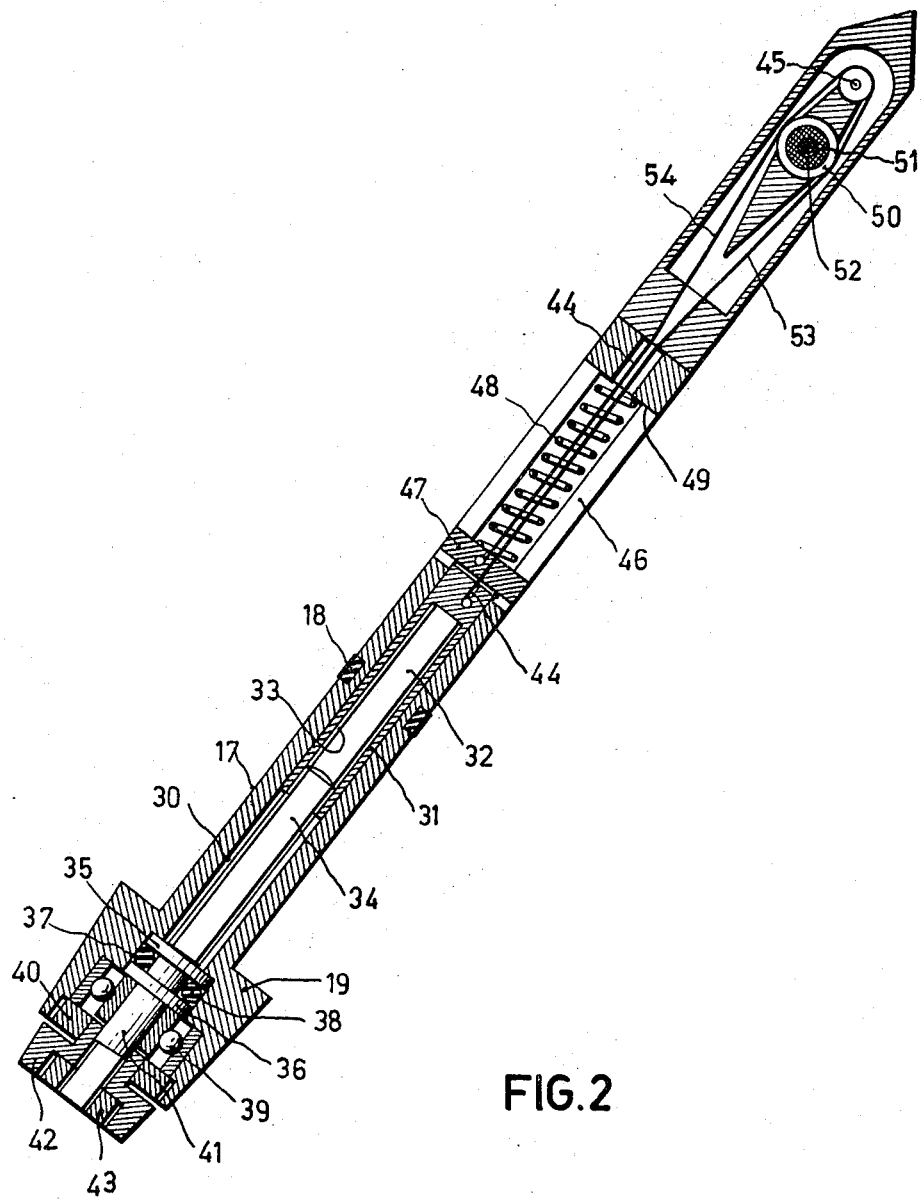

The invention will now be described with reference to the accompanying drawing in which:

FIGURE 1 shows partly in section a specimen support for an electron microscope, and FIGURE 2 shows an enlarged view in section of the specimen holder together with its support and the mechanism for rotating the holder.

An auxiliary piece 1 in the form of a flat dish constitutes part of an electron microscope to which adjoin all parts forming the envelope of the microscope. The part 1 is shown in section and has two bores at an angle of 90° which contain adjusting rods 2 and 3 which are displaceable in their longitudinal direction. Sealing rings 4 and 5 prevent air from penetrating through the bores. The longitudinal displacement of the rods 2 and 3 serves to displace a supporting ring 6 which is arranged to move with some freedom in a hollow space 7 of the auxiliary piece 1. The supporting ring 6 has a radially projecting pin 8 having a pointed end with which the pin 8 engages a sliding piece 9 which is displaceable in an aperture 10 of the auxiliary piece and which is strongly pushed towards the center of the auxiliary piece 1 by means of a spring 11. The supporting ring 6 thus has three points of support. Two of them are displaceable by means of the rods 2 and 3, the spring 11 providing for the part 9 constantly pushing against the pin 8. Due to the pressure of the spring 11, the supporting ring 6 remains clamped in position but its center may be displaced with respect to the center of the auxiliary piece 1 by means of the rods 2 and 3.

The auxiliary piece 1 also has a channel 12 which gives access to the vacuum space of the microscope and which extends further through the supporting ring 6. The channel contains a tube 13 which is secured to the supporting ring 6 and corresponds to a bore 14 in this ring. Along the edge of the bore and within the ring 6 there is provided a spout tube 15 the funnel shape of which accommodates a roller 16 which hermetically closes the aperture 14. The tube 13 contains a rod-shaped support 17 for the specimen holder. A rubber ring 18 prevents air from penetrating between the support 17 and the wall of the tube 13.

By means of a knob 19 the support 17 may be removed from the tube 13 or be pushed inwards further. With the last-mentioned displacement the roller 16 is lifted from the funnel-shaped end of the spout tube 15. The roller is secured to a resilient clasp 20 and slides along an edge 21 at the end of the specimen support to the right. The roller again shows the illustrated position when the support 17 is pulled back.

The specimen support 17 may be pushed inwards until its peak 21 engages a stop secured in the supporting ring 6. When the supporting ring is displaced by the adjusting rods 2 and 3 the support 17 follows this movement due to the tube 13, which contains the support 17, being placed in a tube 23 which lies with some clearance in the channel 12 of the auxiliary piece 1. An annular recess 24 of the channel 12 contains rubber rings 25 which clamp against the tube 23 and against the wall of the recess 24, thus preventing air from penetrating through the gap between the tube 23 and the wall of the channel 12. The tube 23 extends into the recess 26 of the supporting ring 6 and has at its end a rubber tube 27 which provides for the hermetic connection to the ring 6 due to a protuberance 28 of the supporting ring 6 being embraced by the rubber tube 27.

The opposite end of the tube 23 carries a knob 29 which can rotate without the tube following this movement. The knob 29 is rigidly secured to the tube 13 which contains the support 17. The tube 13 may be rotated by means of the knob 29, the support 17 then also rotating about its own axis.

The support 17 shown in FIGURE 2 has a bore 30 which accommodates a sliding piece 31 having a bore 32 with internal screwthread 33 into which fits a threaded spindle 34 the threaded end of which is closed by means of a flange 35. A second flange 36 lies at a short distance next to the first in a wider recess 27 and between the two flanges 35 and 36 there is provided a rubber ring 38 which prevents air from penetrating along the spindle 34 and the wall of the recess 37 into the space of the microscope. The flanges 35 and 36 are maintained in position by means of a ball bearing 39 and a threaded ring 40, preventing the threaded spindle 34 from displacing in the axial direction. A knob 42 is fitted on the end of the spindle 34 by means of a nut 43. The knob 42 serves to rotate the spindle 34 and, when this happens, the sliding piece 31 is displaced within the bore 30.

A wire-shaped or band-shaped cord 44, secured to the sliding piece 31, extends in the longitudinal direction of the support 17 almost to the end thereof and is in itself bent back in situ around a disk 45. The backward portion of the cord 44 is secured to a slide 47 which lies in a slot 46 of the support 17 and is slidable therein over some distance. On rotating the knob 42 and hence the threaded spindle 34, which causes the sliding piece 32 to be displaced to the left, the slide 47 moves to the right. The movement of the slide 47 is subjected to the action of a spring 48 which is provided between the end wall 49 of the slot 46 and the slide 47 and which maintains the cord 44 tightened.

A specimen holder 50 is placed inside the loop formed by the cord 44. The holder 50 has a circular section and is provided with an aperture 51 in which contains the specimen 52 placed on a gauze. The holder 50 is clamped between the forward portion 53 and the backward portion 54 of the cord 44. By turning the knob 42 one portion becomes shorter as much as the other becomes longer so that the displacement of the holder 50 caused by one portion of the cord is neutralized by the other. Thus the holder 50 remains in position but is rotated about its own axis. The addition of this rotational movement to the other displacements which the specimen can undergo makes it possible to turn the specimen about any axis located in the plane of the specimen and diffraction photographs may thus be taken of the mutual distances of any group of lattice planes.

What is claimed is:

1. In an electron microscope, a specimen support movable in the path of an electron beam, said specimen support extending through a housing for said microscope and being hermetically sealed therein, a circular specimen holder rotatably connected to said specimen support for positioning the specimen in the path of the electron beam, a wire-like member bent into a loop within which said specimen holder is clamped, a resilient member within said specimen support to which one end of said wire-like member is connected for maintaining said wire-like member under tension, and a member attached to said specimen support and external to the housing to which the other end of said wire-like member is connected whereby said wire-like member can be moved thereby rotating the specimen holder.

2. In an electron microscope, a specimen support movable in the path of an electron beam, said specimen support extending through a housing for said microscope and being hermetically sealed therein, a circular specimen holder rotatably connected to said specimen support for positioning the specimen in the path of the electron beam, a wire-like member bent into a loop within which said specimen holder is clamped, a resilient member within said specimen support to which one end of said wire-like member is connected for maintaining said wire-like member under tension, a slidable member movable within a bore in said specimen support to which the other end of said wide-like member is connected, and a member attached to said specimen support and external to the housing rotatable about a longitudinal axis of the specimen support which rectilinearly moves said sliding member thereby rotating said specimen holder.

References Cited

UNITED STATES PATENTS

| | | | |
|---|---|---|---|
| 2,131,536 | 9/1938 | Knoll et al | 250—49.5 |
| 2,713,125 | 7/1955 | Geisler et al | 250—51.5 |
| 2,845,540 | 7/1958 | Franken et al | 250—49.5 |

RALPH G. NILSON, *Primary Examiner.*

W. F. LINDQUIST, *Assistant Examiner.*